(12) United States Patent
Pietro et al.

(10) Patent No.: US 9,916,784 B2
(45) Date of Patent: Mar. 13, 2018

(54) INTEGRATED DRIVE CIRCUIT FOR MULTI-SEGMENT ELECTROLUMINESCENT DISPLAYS

(71) Applicant: Scobil Industries Corp., Brampton (CA)

(72) Inventors: Patrick D. Pietro, Grand Island, NY (US); William J. Pietro, Toronto (CA); Paul Savel, Pickering (CA)

(73) Assignee: SCOBIL INDUSTRIES CORP., Brampton (CA)

( * ) Notice: Subject to any disclaimer, the term of this patent is extended or adjusted under 35 U.S.C. 154(b) by 0 days.

(21) Appl. No.: 15/194,615

(22) Filed: Jun. 28, 2016

(65) Prior Publication Data
US 2016/0379536 A1   Dec. 29, 2016

Related U.S. Application Data

(63) Continuation of application No. 13/859,211, filed on Apr. 9, 2013, now Pat. No. 9,406,256, which is a
(Continued)

(51) Int. Cl.
*G09G 3/30* (2006.01)
*G09G 3/12* (2006.01)
*H05B 33/08* (2006.01)

(52) U.S. Cl.
CPC ............ *G09G 3/12* (2013.01); *G09G 3/30* (2013.01); *H05B 33/08* (2013.01);
(Continued)

(58) Field of Classification Search
CPC . H05B 33/08; G09G 3/12; G09G 3/30; G09G 2330/028
See application file for complete search history.

(56) References Cited

U.S. PATENT DOCUMENTS 5,854,539 A   12/1998   Pace et al.
5,886,475 A   3/1999   Horiuchi et al.
(Continued)

FOREIGN PATENT DOCUMENTS

WO   2005015529 A2   2/2005

OTHER PUBLICATIONS

Document relating to PCT Application No. PCT/CA2011/001137, dated Jan. 18, 2012 (International Search Report).
(Continued)

*Primary Examiner* — Xuemei Zheng
(74) *Attorney, Agent, or Firm* — Bereskin & Parr LLP/S.E.N.C.R.L., s.r.l.

(57) ABSTRACT

An integrated drive circuit for multi-segment electroluminescent displays is provided. During a charging phase, the electroluminescent segments are charged by a common charge circuit, and partially discharged using separate discharge circuits associated with individual electroluminescent segments. A controller provides essentially independent control over the respective discharge circuits so, by the end of the charging phase, the EL segments can be charged to correspondingly different final voltages. Then during a discharging phase following the charging phase, the electroluminescent segments are completely discharged, thereby emitting an intensity of light that varies roughly in proportion to the final accumulated voltage. The controller can be pre-programmed with a spatial-temporal light pattern so that, using the disclosed integrated drive circuit, the electroluminescent display can be operated to generate rudimentary animations.

20 Claims, 7 Drawing Sheets

Related U.S. Application Data continuation of application No. PCT/CA2011/001137, filed on Oct. 7, 2011.

(60) Provisional application No. 61/391,927, filed on Oct. 11, 2010.

(52) U.S. Cl.
CPC . *G09G 2310/061* (2013.01); *G09G 2330/028* (2013.01); *Y02B 20/325* (2013.01)

(56) References Cited

U.S. PATENT DOCUMENTS

| | | |
|---|---|---|
| 6,369,516 B1 | 4/2002 | Iketsu et al. |
| 6,580,409 B1 | 6/2003 | Ito et al. |
| 8,026,670 B2 | 9/2011 | Fryer |
| 2004/0178747 A1 | 9/2004 | Jones et al. |
| 2005/0057458 A1* | 3/2005 | Forsythe .......... G09G 3/14 345/76 |
| 2009/0153064 A1 | 6/2009 | Fryer |
| 2010/0188049 A1* | 7/2010 | Haddani .......... G01R 31/3613 320/134 |

OTHER PUBLICATIONS

Document relating to PCT Application No. PCT/CA2011/001137, dated Jan. 18, 2012 (Written Opinion of the Searching Authority).
Document relating to PCT Application No. PCT/CA2011/001137, dated Apr. 16, 2013 (International Preliminary Report Patentability).

* cited by examiner

INTEGRATED DRIVE CIRCUIT FOR MULTI-SEGMENT ELECTROLUMINESCENT DISPLAYS

CROSS-REFERENCE TO RELATED PATENT APPLICATIONS

The application is a continuation of U.S. patent application Ser. No. 13/859,211 filed on Apr. 9, 2013, which is a continuation of International Application No. PCT/CA2011/001137 filed on Oct. 7, 2011, which claims the benefit of U.S. Provisional Application No. 61/391,927, filed on Oct. 11, 2010.

FIELD

The described embodiments relate generally to an integrated drive circuit for multi-segment electroluminescent displays and, more particularly, to an integrated drive circuit for producing animated illumination of multi-segment electroluminescent displays.

BACKGROUND

Electroluminescent ("EL") cells or segments generally comprise a layer of phosphor material, such as a zinc sulphide powder, housed between two electrodes. Typically although not in every case, one of the cell electrodes can be composed of a transparent material, such as indium tin oxide, deposited onto a transparent substrate, which provides the front surface for the electroluminescent segment. The phosphor layer housed between the two conductors behaves generally like a capacitor, in which the phosphor layer acts as a dielectric insulator. Depending on its size, the effective capacitance of the electroluminescent segment can range anywhere from picofarads to microfarads. Light is radiated from the electroluminescent cell by subjecting the phosphor layer to a strong electric field, causing photoemission as electron-hole pairs separated in the phosphor layer recombine.

To produce light from the electroluminescent cell, a large voltage is applied across its electrodes. In the resulting current flow, charge is accumulated on the cell electrodes due to the capacitive nature of the electroluminescent segment. To prevent the long-term buildup of charge on the cell electrodes, the applied voltage is typically alternated between positive and negative polarities. Any charge that is accumulated across the electroluminescent segment electrodes during a charging phase is subsequently dissipated during a discharging phase and, through alternation of the two discrete phases, effectively continuous photoemission can be maintained within the phosphor layer. Depending on the size of the electroluminescent segment and the desired illumination intensity, an alternating voltage in the range of 100-150 V, and having a frequency in the range of 100-400 Hz, may be appropriate.

Because of their compact size and relatively low current consumption, electroluminescent cells are widely used in small battery operated electronic devices. For example, liquid crystal displays can be backlight using electroluminescent cells in portable communication devices, such as mobile phones, personal data assistants, portable music players, and the like. The output of the batteries used in these electronic devices, however, is commonly a low-level DC voltage in the range of about 1-5 V. Accordingly, some form of voltage converter is often used to convert the low-voltage DC output of the battery into the high-voltage AC current used to driving the electroluminescent cell.

SUMMARY

In a first broad aspect, at least some of the described embodiments provide an integrated drive circuit for an electroluminescent display that has at least one electroluminescent segment. The integrated drive circuit includes a charge circuit coupled to the electroluminescent segment and configured to transmit energy received from a power supply to the electroluminescent segment as a discrete sequence of charge pulses to accumulate a voltage across the electroluminescent segment, and a discharge circuit coupled to the electroluminescent segment and configured to dissipate the accumulated voltage by selectively forming a shunt path across the electroluminescent segment to drain energy stored in the electroluminescent segment.

In some embodiments, the integrated drive circuit includes a controller configured to control the voltage across the electroluminescent segment by generating a charge control signal for the charge circuit and a discharge control signal for the discharge circuit. The charge circuit can be configured to generate and transmit the discrete sequence of charge pulses to the electroluminescent segment in response to the charge control signal. The discharge circuit can be configured to selectively form the shunt path across the electroluminescent segment in response to the discharge control signal.

The controller can be configured to control a final voltage accumulated across the electroluminescent segment at the end of a charging phase by controlling the charge circuit to transmit the discrete sequence of charge pulses during the charging phase, and determining a number of charge pulses to be transmitted in the discrete sequence of charge pulses.

The controller can be configured to reset the voltage across the electroluminescent segment by controlling the discharge circuit to completely discharge the electroluminescent segment during a discharging phase succeeding the charging phase.

In some embodiments, the charge circuit includes a charge pump coupled across the electroluminescent segment, which is used to generate the discrete sequence of charge pulses. The charge pump can be implemented using a storage element for coupling to the power supply, an output element coupled to the storage element, and a gating switch that is controllable by the charge control signal to selectively accumulate energy received from the power supply in the storage element, and release energy from the storage element to the output element for transmission to the electroluminescent segment.

In some embodiments, the discharge circuit includes a shunt switch connected across the electroluminescent segment, which is controllable by the discharge control signal to provide a short circuit across the electroluminescent segment.

In some embodiments, the integrated drive circuit includes an isolation switch for coupling the charge circuit to the power supply, and which is controllable to selectively connect and disconnect the power supply to and from the charge circuit.

In some embodiments, the electroluminescent display has a plurality of parallel-connected electroluminescent segments, in which case the charge circuit can be coupled to each electroluminescent segment, and can be configured to transmit the discrete sequence of charge pulses to the plurality of electroluminescent segments to accumulate a corresponding voltage across each electroluminescent segment. A corresponding discharge circuit can also be coupled to each electroluminescent segment, with each corresponding discharge circuit configured to selectively form a corresponding shunt path across that electroluminescent segment to dissipate the corresponding accumulated voltage. The controller can be also configured to control the corresponding voltage accumulated across each electroluminescent segment by generating a corresponding discharge control signal for each corresponding discharge circuit.

The controller can be configured to control a corresponding final voltage accumulated by each electroluminescent segment at the end of a charging phase by controlling at least one corresponding discharge circuit to partially discharge the corresponding voltage accumulated across that electroluminescent segment during the charging phase.

The controller can be configured to control the at least one corresponding discharge circuit to partially discharge the corresponding accumulated voltage by controlling the charge circuit to transmit the discrete sequence of charge pulses having a number of charge pulses during the charging phase, controlling the at least one corresponding discharge circuit to drain a discrete sequence of partial discharge pulses from that electroluminescent segment during the charging phase and, for the at least one corresponding discharge circuit, determining a number of partial discharge pulses to be drained in the discrete sequence of partial discharge pulses based upon the number of charge pulses in the discrete sequence of charge pulses.

The controller can be configured to control a timing of the discrete sequence of partial discharge pulses to coincide with intervals between successive charge pulses in the discrete sequence of charge pulses.

The controller can be configured to control the corresponding final voltage accumulated by each electroluminescent segment at the end of the charging phase independently of other electroluminescent segments, so that the corresponding final voltage of at least two electroluminescent segments differs.

The controller can be configured to reset the voltage across each electroluminescent segment by controlling each corresponding discharge circuit to completely discharge that electroluminescent segment during a discharging phase succeeding the charging phase.

In a second broad aspect, at least some of the described embodiments provide a method of supplying power to an electroluminescent display that has at least one electroluminescent segment. The method involves accumulating a voltage across the electroluminescent segment during a charging phase by transmitting energy from a power supply to the electroluminescent segment as a discrete sequence of charge pulses, and dissipating the voltage accumulated across the electroluminescent segment during a discharging phase succeeding the charging phase by forming a shunt path across the electroluminescent segment.

In some embodiments, the method can involve controlling a final voltage accumulated across the electroluminescent segment at the end of the charging phase. The final voltage accumulated across the electroluminescent segment can be controlled by determining a number of charge pulses in the discrete sequence of charge pulses to be transmitted to the electroluminescent segment.

In some embodiments, the electroluminescent display has a plurality of parallel-connected electroluminescent segments, in which case the method can involve accumulating a corresponding voltage across each electroluminescent segment during the charging phase by transmitting the discrete sequence of charge discrete pulses to each electroluminescent segment, and dissipating the corresponding voltage accumulated across each electroluminescent segment during the discharging phase by connecting a corresponding shunt path across that electroluminescent segment.

The method can involve controlling a corresponding final voltage accumulated across each electroluminescent segment at the end of the charging phase by partially discharging the corresponding voltage accumulated across at least one electroluminescent segment during the charging phase. The corresponding final voltage accumulated across each electroluminescent segment can be controlled by transmitting the discrete sequence of charge pulses having a number of charge pulses during the charging phase, draining a discrete sequence of partial discharge pulses from that electroluminescent segment during the charging phase and, for the at least one corresponding discharge circuit, determining a number of partial discharge pulses to be drained in the discrete sequence of partial discharge pulses based upon the number of charge pulses in the discrete sequence of charge pulses.

In some embodiments, the method can involve timing the discrete sequence of partial discharge pulses to coincide with intervals between successive charge pulses in the discrete sequence of charge pulses.

In some embodiments, the method can involve controlling the corresponding final voltage accumulated by each electroluminescent segment at the end of the charging phase independently of other electroluminescent segments, so that the corresponding final voltage of at least two electroluminescent segments differs.

In some embodiments, the method can involve completely discharging each electroluminescent segment during the discharging phase.

These and other aspects of the described embodiments are set forth herein.

BRIEF DESCRIPTION OF THE DRAWINGS

A detailed description of various embodiments of the invention, including at least one preferred embodiment, is provided herein below with reference to the following drawings, by way of example only, and in which.

Figure 1:
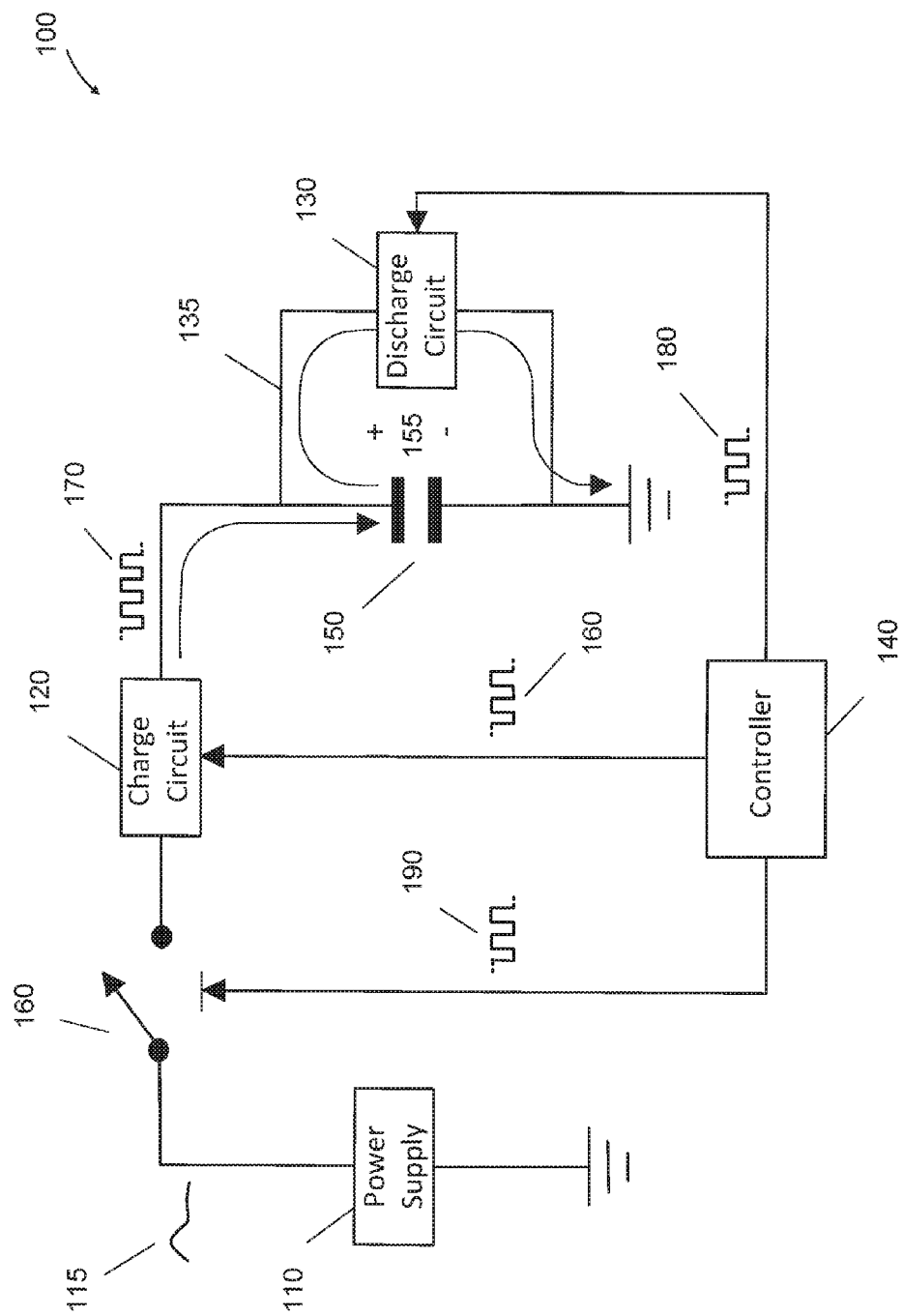
FIG. 1 is a simplified schematic diagram of an integrated drive circuit for an electroluminescent display having at least one electroluminescent segment.

It will be understood that reference to the drawings is made for illustrative purposes only, and is not intended to limit the scope of the described embodiments in any way. For clarity and convenience, reference numerals may be repeated throughout the drawings (with or without an offset) to indicate analogous components or features.

DESCRIPTION OF EXEMPLARY EMBODIMENTS

Electroluminescent displays are often divided into a grid of electroluminescent segments that can be individually illuminated. The illumination emitted by each individual EL segment can be maintained at a constant intensity to provide an overall static, or time-invariant, display output. Alternatively, to provide the appearance of animation, the illuminations emitted by different EL segments within the grid can be varied according to a pre-programmed sequence to form a mixed temporal-spatial pattern of light, (i.e., light intensity that is modulated both spatially and temporally). For example, the El display can be operated so as to produce flashing or scrolling text, rudimentary graphics, and other forms of animations. The described embodiments provide an integrated drive circuit for a multi-segment EL display that provides independent control over individual segments within the EL display.

Reference is made initially to FIG. 1, which illustrates a schematic diagram of an integrated drive circuit 100 for an electroluminescent display. The integrated drive circuit 100 includes a power supply 110, charge circuit 120, discharge charge circuit 130, controller 140, electroluminescent ("EL") segment 150, and isolation switch 160. A single EL segment 150 is shown in FIG. 1, although as will be described in more detail below, in an alternative configuration, the integrated drive circuit 100 can be adapted to drive a plurality of paralleled-connected EL segments contained within the EL display.

The positive terminal of the power supply 110 is coupled to the charge circuit 120 via the isolation switch 160 and provides a supply voltage signal 115, which can be low-voltage DC, to the charge circuit 120. The negative terminal of the power supply 110 can be connected to ground. In some cases, the power supply 110 is implemented using a DC source, such as a battery or solar panel, to generate low-voltage DC for supplying the charge circuit 120. However, the power supply 110 is not limited to low-voltage DC sources and alternatively can be implemented using an AC power supply, such as a 50-Hz or 60-Hz utility connection, together with a rectifier or voltage converter to generate the supply voltage signal 115 for the charge circuit 120. If desired, a voltage regulator can also be implemented in the power supply 110 to provide a temperature-stabilization of the supply voltage signal 115.

Charge circuit 120 is configured to absorb energy from the supply voltage signal 115 received from the power supply 110 and, in response to a charge control signal 160 provided by the controller 140, charge the EL segment 150 by generating a discrete sequence of charge pulses 170. As the sequence of charge pulses 170 is pumped to the EL segment 150, some energy is dissipated as waste heat, but most of the transferred charge is stored in the EL segment 150, resulting in the incremental accumulation of a voltage 155 across the positive and negative electrodes of the EL segment 150. When subsequent activation of the discharge circuit 130 causes the accumulated voltage 155 to dissipate, the resulting re-polarization of the electric field formed within the phosphor layer (i.e., due to the accumulated voltage) causes photoemissive recombination of electron-hole pairs.

The controller 140 controls the charge circuit 120, as will be explained in more detail below, so that each individual pulse in the sequence of charge pulses 170 delivers approximately the same incremental charge $\Delta Q$ to the EL segment 150. Since each incremental charge $\Delta Q$ accumulates a corresponding incremental voltage $\Delta V$ across the EL segment 150, related proportionally to the incremental charge $\Delta Q$ by the effective capacitance of the EL segment 150, the total accumulated voltage 155 is roughly proportionate to the number of charge pulses 170 delivered by the charge circuit 120. The intensity of the illumination emitted by the EL segment 150 is then in turn related proportionately to the accumulated voltage 155.

The capacitive characteristics of the EL segment 150 can vary depending on different properties of the EL segment 150, such as the material characteristics and thickness of the phosphor layer, and the effective area of the EL segment 150. By testing the electroluminescent performance of the EL segment 150 during design of the EL display, the electroluminescent performance of the EL segment 150 can be characterized for a range of different accumulated voltages 155. Using this information, a relationship between light intensity and the total accumulated voltage 155 can be formulated and subsequently used to program different charge pulse sequences in the controller 140 corresponding to different light intensities. In this way, the intensity of light generated by the EL segment 150 is controllable based upon the characterization of the EL segment 150, the number and duration of charge pulses delivered by the charge circuit 120 and other parameters of the integrated drive circuit 100 as will be apparent.

Figure 2:
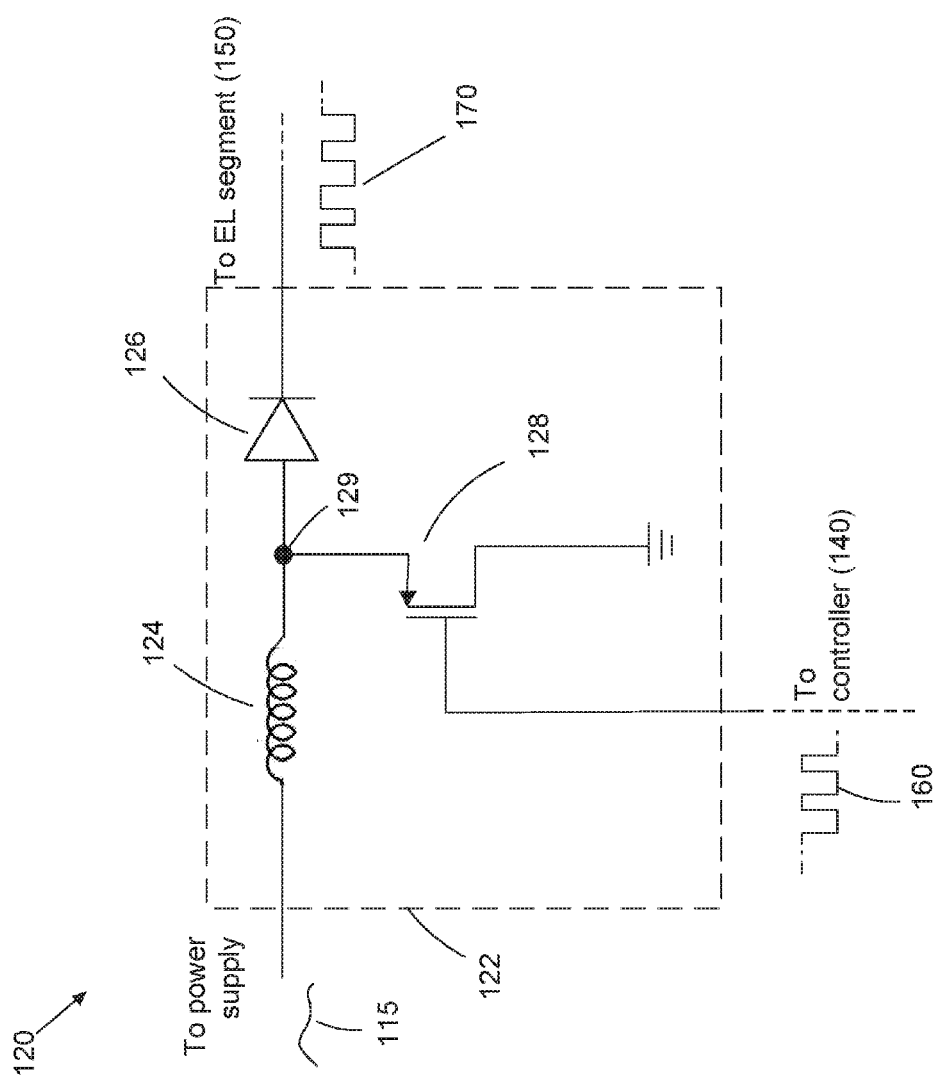
FIG. 2 is a simplified schematic diagram of a charge circuit included in the integrated drive circuit shown in FIG. 1.

Referring now to FIG. 2, the charge circuit 120 can be implemented using a modified form of a charge pump 122, in which the EL segment 150 replaces the capacitive element normally associated with the charge pump 122. In the exemplary configuration shown, the charge pump 122 includes the inductor 124, diode 126 and gating switch 128 coupled together in boost configuration. One terminal of the inductor 124 is coupled to the positive terminal of the power supply 110 and, depending on the state of the gating switch 128, either stored energy absorbed from the voltage supply signal 115, releases some of that stored energy to the diode 126 for transmission to the EL segment 150.

The gating switch 128 is implemented, for example, using a semiconductor switch, such as a metal oxide semiconductor field effect transistor (MOSFET), bipolar junction transistor (BJT), or junction field effect transistor (JFET). As shown in FIG. 2, gating switch 128 is implemented using a PMOS transistor driven by the charge control signal 170, although other types or configurations of gating switches may be apparent.

When the gating switch 128 is closed and conducting, the voltage drop across the gating switching 128 is minimal, pulling the common node 129 of the charge pump 122 down near to ground potential. Current flow in the inductor 124 ramps up in proportion to the internal field generated as energy from the power supply 110 is absorbed. Reversing biasing of the diode 126 also prevents the accumulated voltage 155 across the EL segment 150 from dissipating (unless through the discharge circuit 130, as will be explained more below). When the gating switch 128 is opened and no longer conducting, current flowing through the inductor 124 is forced out through the diode 126 to the EL segment 150 until either the gating switch 128 is closed again or all the energy stored in the inductor 124 is released.

By modulating the charge control signal 160 between high and low voltage states, the gating switch 128 is alternately opened and closed, causing the charge circuit 120 to pump charge intermittently to the EL segment 150. In order to generate the sequence of charge pulses 170 having approximately equally weighted charge pulses, the controller 140 can apply a pulse width modulation (PWM) or pulse density modulation (PDM) scheme, for example, but other suitable schemes may be apparent as well. Moreover, as will be appreciated, with this particular arrangement of the inductor 124, diode 126 and gating switching 128, the effective voltage applied across the EL segment 150 can be made to be substantially larger than the magnitude of the supply voltage signal 115, if the duty cycle of the charge control signal 160 is sufficiently large.

Figure 3:
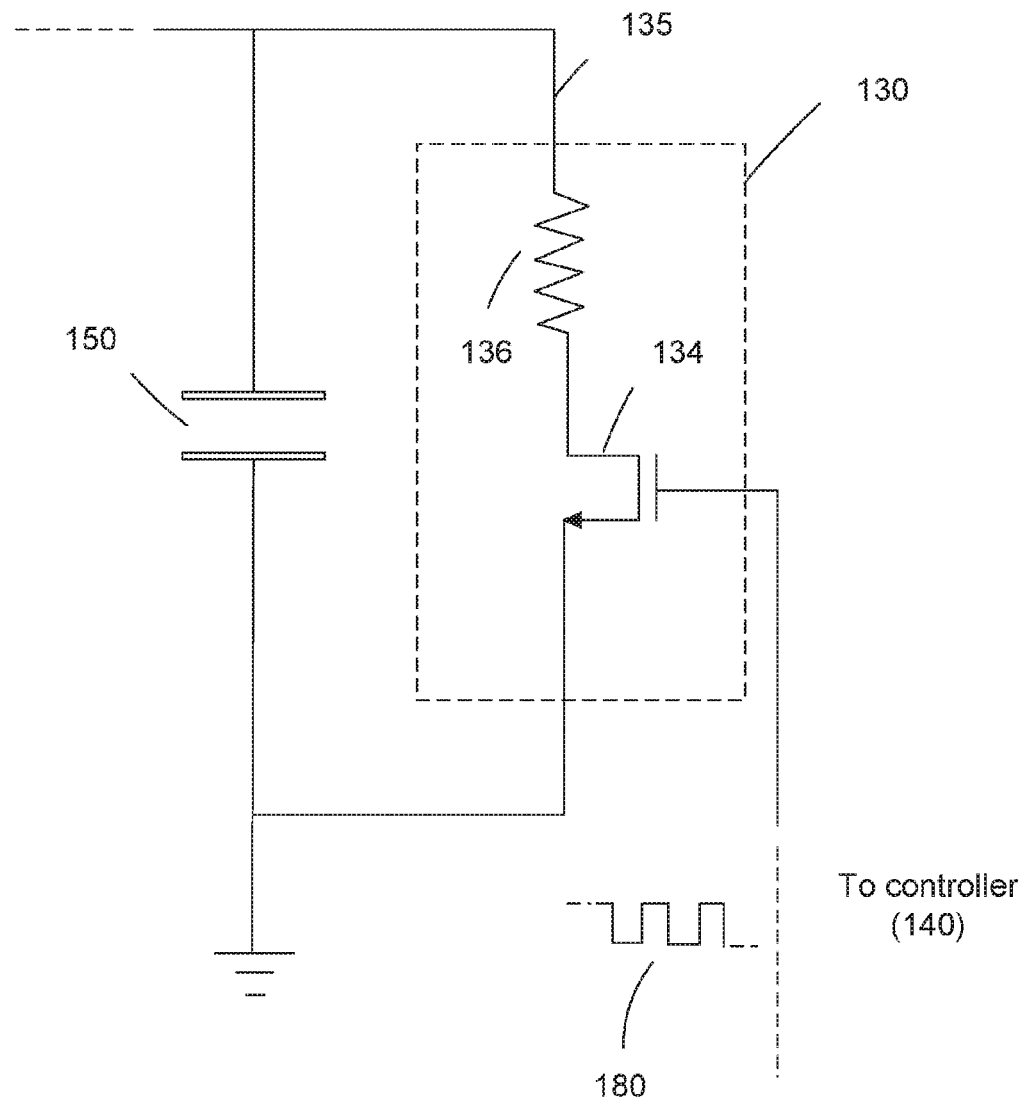
FIG. 3 is a simplified schematic diagram of a discharge circuit included in the integrated drive circuit shown in FIG. 1.

Referring now to FIG. 3, the discharge circuit 130 is parallel-coupled to the EL segment 150 and, in response to a discharge control signal 180 provided by the controller 140, selectively forms a shunt path 135 connecting the positive and negative electrodes of the EL segment 150. The discharge circuit 130 is controllable using the discharge control signal 180, so that the shunt path 135 can be formed only when the charge circuit 120 is not delivering charge pulses to the EL segment 150. Accordingly, when the charge circuit 120 is active, the shunt path 135 can be broken so that the only path to ground from the output of the charge circuit 120 includes the EL segment 150. However, when formed, the shunt path 135 provides an alternate path to ground for draining any charge stored in the EL segment 150 and thereby dissipating any voltage that had accumulated across the EL segment 150. As mentioned above, the field re-polarization caused by draining the EL segment 150 results in photoemission within the phosphor layer.

The discharge circuit 130 is implemented using a switching transistor 134, which is an NMOS transistor in the exemplary configuration shown in FIG. 3, and an optional shunt resistor 136. The source of the switching transistor 134 is coupled to the negative terminal of the EL segment 150, while the gate of switching transistor 134 is driven by the discharge control signal 180. When implemented using an NMOS transistor, as will be appreciated, the switching transistor 134 is closed and conducting when drive with a gate voltage that exceeds the threshold voltage of the switching transistor 134, but is open and not conducting when the gate voltage is less than the transistor threshold voltage.

In some cases, the drain of the switching transistor 134 is coupled directly to the positive terminal of the EL segment 150, but alternatively (as shown) can be coupled using the shunt resistor 136. The shunt resistor 136 is optional and can be included in the discharge circuit 130 to adjust the rate at which the EL segment 150 drains through the shunt path 132 when formed (i.e., by changing the effective time constant of the shunt path 135).

Referring back to FIG. 1, isolation switch 160 couples the charge circuit 120 to the power supply 110, and is controllable using the isolation switch control signal 190 generated by the controller 140. When the isolation switch 160 is closed and conducting, the charge circuit 120 is connected to the power supply 110 and absorbing the voltage supply signal 115 received from the power supply 110. However, when the isolation switch 160 is opened, the power supply 110 is disconnected from the charge circuit 120 and effectively isolated from the rest of the integrated drive circuit 100. Depending on the current handling requirements of the isolation switch 190, different semiconductor devices can be used to implement the isolation switch 190, as will be appreciated, which MOSFETs, BJTs and JFETs, for example.

The isolation switch 160 can be used by the controller 140 as a form of ON/OFF switch for the EL segment 150 within the integrated drive circuit 100. By disconnecting its source of power, opening the isolation switch 160 effectively turns off the EL segment 150. In the reverse situation, closing the isolation switch 160 effectively turns on the EL segment 150 by connecting the power supply 110 and thereby re-establishing a source of power for the EL segment 150.

The controller 140 generates the isolation switch control signal 190 for the isolation switch 160 based on sensor data generated by one or more sensors associated with the EL display. For example, an associated light sensor can detect a level of ambient light in the vicinity of the EL display and, if the detected ambient light falls below a threshold level, the controller 140 can decide to connect the power supply 110 by closing the isolation switch 160. As other examples, the controller 140 can generate the isolation switch control signal 190 based upon sensor data provided by one or both of a motion sensor (which detects relative motion of the EL display) and a noise sensor (which detects an ambient level of noise in the vicinity of the EL display). Alternatively, the isolation switch 160 can be implemented using a tumbler switch (i.e., a Mercury switch) that closes when the EL display is in certain relative orientations.

In some configurations, a real-time clock can also be associated with the EL display, so that the controller 140 can executed programmed device turn on or turn off. For example, the controller 140 can be programmed to turn the device off, by opening the isolation switch 160, if a maximum idle time has been exceeded or after a pre-programmed duration following the EL display being turned on. Scheduled turn on and turn off is also possible in some configurations of the integrated drive circuit 100.

The controller 140 is coupled to the charge circuit 120 and the discharge circuit 130 for providing corresponding signals used to control to each component. Thus, as mentioned above, controller 140 is programmed to generate the charge control signal 160 for the charge circuit 120 and the discharge control signal 180 for the discharge circuit 130.

Figure 4:
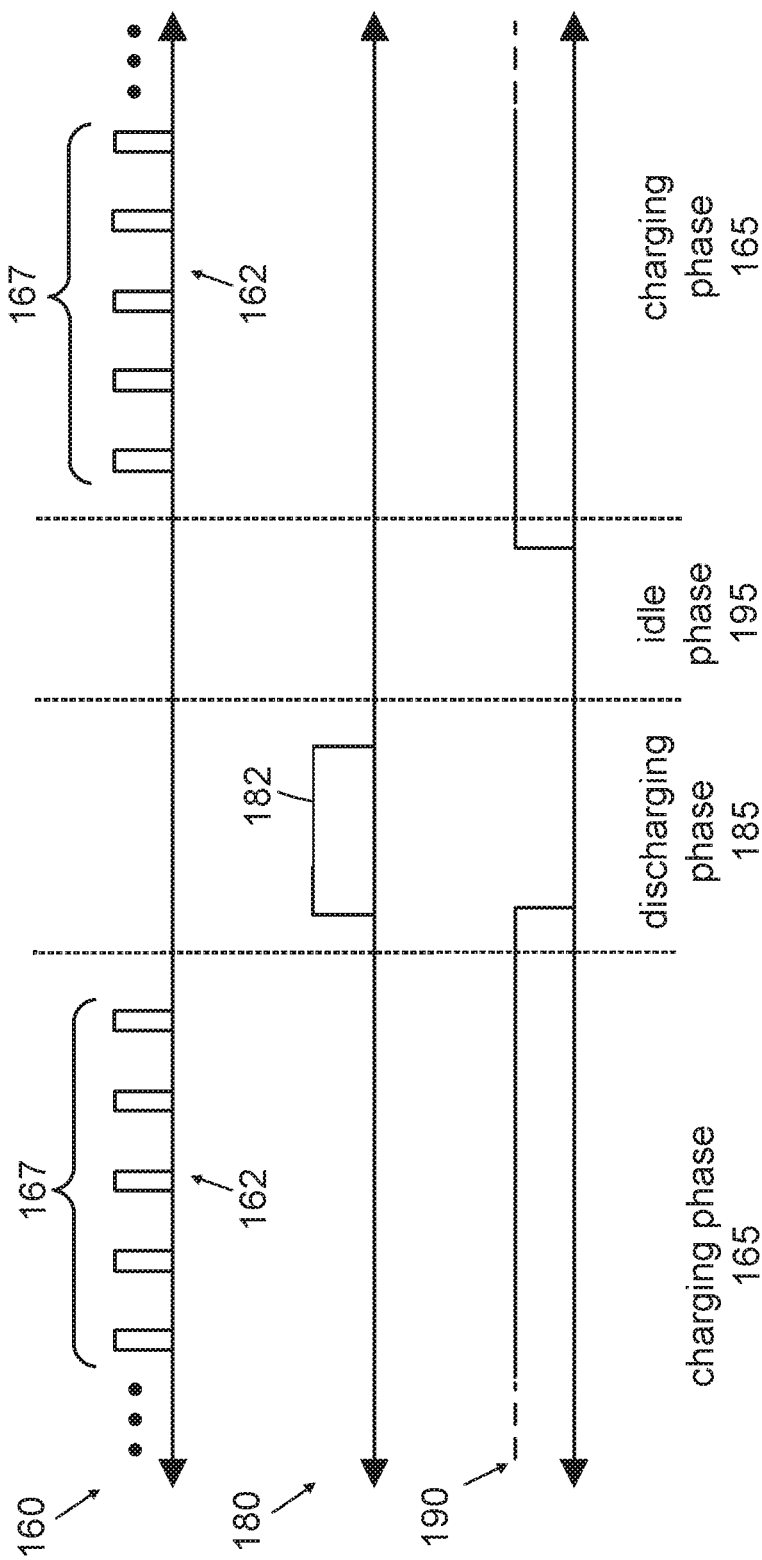
FIG. 4 is a timing diagram illustrating operation of the integrated drive circuit shown in FIG. 1.

Referring now to FIGS. 1 and 4, the integrated drive circuit 100 operates under the direction of the controller 140 as follows. A charging phase 165 commences shortly after the isolation switch control signal 190, which had previously been driven to the low-voltage state, is re-asserted to a high-voltage state, thereby closing the isolation switch 160 and connecting the charge circuit 120 to the power supply 110. As mentioned before, with the isolation switch 160 closed and connecting, the integrated drive circuit 100 is in an active mode. Throughout the charging phase 165, the discharge control signal 180 is also drive to the low-voltage state to open the shunt path 135 and force current flowing out of the charge circuit 120 to accumulate in the EL segment 150. Shortly after the charging phase 165 commences, the controller 140 provides a sequence of gating signals 162 to the charge circuit 120 to begin charging the EL segment 150.

The controller 140 determines the sequence of gating signals 162 so that the charge circuit 120 outputs the sequence of charge pulses 170. For example, the controller 140 determines (or alternatively has been pre-programmed with) the total number of charge pulses 167 in the sequence of charge pulses 162 based on the characterization of the EL segment 150 and the desired final voltage 155 to be accumulated across the EL segment at the end of the charging phase 165. The controller 140 also determines (or is pre-programmed with) the duration of each individual charge pulse in the sequence of charge pulses 162, in terms of the pulse duty cycle, so that approximately the same incremental charge $\Delta Q$ is contained within each pulse. Although the sequence of gating signals 162 is illustrated for convenience having a constant duty cycle, it should be appreciated that the controller 140 may implement a more complex modulation scheme, such as PWM or PDM, in which the duty cycle of the sequence of gating signals 162 varies with time.

The charging phase 165 ends once the voltage 155 accumulated across the EL segment 150 reaches its desired final voltage. At that point the charging phase 165 ends and is succeeded by a discharging phase 185. Shortly after the start of the discharging phase 185, the isolation switch control signal 190 is lowered to the low-voltage state in order to isolate the power supply 110 from the rest of the integrated drive circuit 100. Temporarily disconnecting the power supply 110 during the discharging phase 185 increases the overall efficiency of the integrated drive circuit 100 by reducing losses in the power supply 110 and charge circuit 120 when these components are not actively operating.

At or near the same time as the isolation switch 160 is opened, the controller 140 also generates a discharge signal 182, in response to which the discharge circuit 130 forms the shunt path 135 across the EL segment 150. Due to the reverse isolation of the charge circuit 120 (i.e. provided by the diode 126 in FIG. 2), any charge stored in the EL segment 150 during the charging phase 165 is completely drained through the shunt path 135. The length of the discharge signal 182 is variable and can depend on the magnitude of the final accumulated voltage 155, as well as the discharge rate of the shunt path 132, but should be sufficiently long that the EL segment 150 completely discharges. Thus, by the end of the discharging phase 185, the final voltage 155 accumulated across the EL segment 150 during the charging phase 165 will have been completely dissipated and the EL segment 150 reset for a new charging phase 165.

An optional idle phase 195 can be added between the end of the discharging phase 185 and the start of a new charging phase 165. During the optional idle phase 195, the EL segment 150 is being neither charged nor discharged, while the power supply 110 remains isolated from the rest of the integrated drive circuit 100 by opening of the isolation switch 160. The optional idle phase 195 ends shortly after the controller 140 asserts the isolation switch control signal 190 in order to re-connect the power supply 110 and begin a new charging phase 165. The optional idle phase 195 has a variable duration and, in some configurations, can be eliminated altogether. In that case, the isolation switch control signal 190 can be asserted at or near the end of the discharge signal 182 to mark the start of the new charging phase 165 immediately following the end of the discharging phase 185.

By charging the EL segment 150 to the same final voltage 155 at the end of each charging phase 165, followed alternatingly with the discharging phase 185 and optional idle phase 195, the EL segment 150 will produce an essentially constant intensity of light. As mentioned above, the intensity of illumination produced can be controlled based on the magnitude of the final accumulated voltage 155. The intensity is also adjustable by the controller 140 determining the number of charge pulses in the sequence of charge pulses 170 to pump into the EL segment 150. But in general, the intensity of light produced by the EL segment 150 can be made to vary as a function of time by controlling the number of charge pulses delivered to the EL segment 150 in successive charging phases 165.

Figure 5:
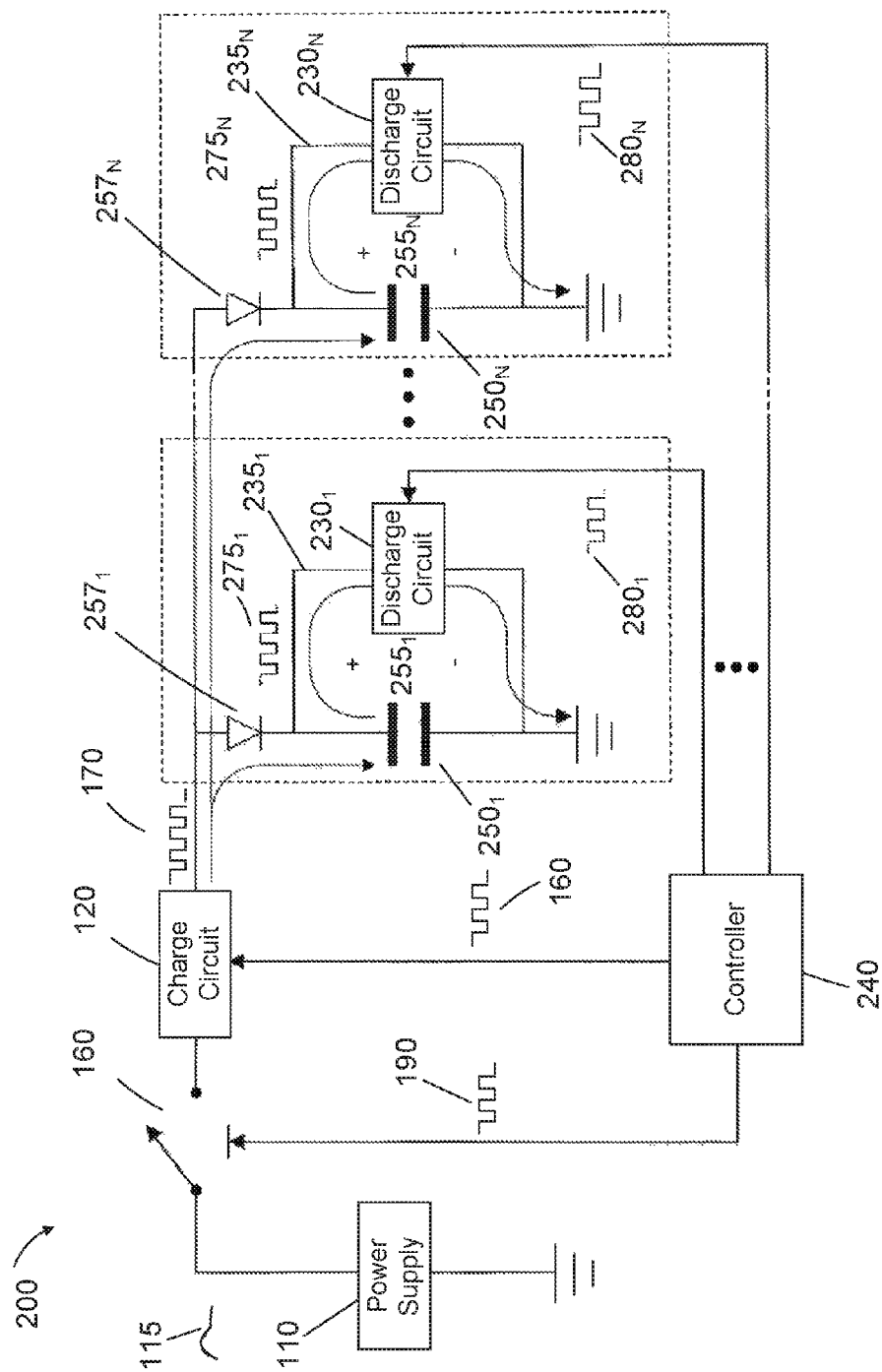
FIG. 5 is a simplified schematic diagram of an integrated drive circuit for an electroluminescent display having multiple parallel-connected electroluminescent segments.

Referring now to FIG. 5, there is illustrated an integrated drive circuit 200 for an electroluminescent display. The integrated drive circuit 200 is similar to the integrated drive circuit 100 shown in FIG. 1, but is adapted for an electroluminescent display having multiple parallel-connected EL segments $250_{1-N}$. Although only two such parallel-connected EL segments $250_1$ and $250_N$ are shown explicitly in FIG. 5, it should be appreciated that each parallel-connected EL segment $250_{1-N}$ can be identical. The parallel-connected EL segments $250_{1-N}$ can also be arranged physically within the EL display according to a grid or matrix distribution. For the sake of clarity, discussion of like elements or aspects of the two integrated drive circuits 100 and 200 may be abbreviated, while specific differences may be highlighted or emphasized.

Power supply 110 is coupled to the charge circuit 120 using isolation switch 160, which selectively connects and disconnects power supply 110 to the charge circuit 120 in response to the isolation switch control signal 190. Again the power supply 110 provides a supply voltage signal 115 to the charge circuit 120, which can be relatively low-voltage DC. The charge circuit 120 is coupled to each respective parallel-connected EL segment $250_{1-N}$ through corresponding diodes $257_{1-N}$, which provide reverse isolation for each respective EL segment $250_{1-N}$, not just from charge circuit 120, but also from other respective EL segments $250_{1-N}$. The charge circuit 120 can have the same configuration as shown in FIG. 2 and, as described above, deliver energy to each corresponding EL segment $250_{1-N}$, in response to the charge control signal 160 provided by controller 240, by generating a discrete sequence of charge pulses 170

A corresponding discharge circuit $230_{1-N}$, each having the general configuration shown in FIG. 3, for example, is coupled across the parallel-connected EL segments $250_{1-N}$. Each discharge circuit $230_{1-N}$ is independently controllable, using a corresponding discharge control signal $280_{1-N}$ generated and provided by the controller 240, to form corresponding shunt paths $235_{1-N}$ across the EL segments $250_{1-N}$. As before the shunt paths $235_{1-N}$ can be controllably operated to dissipate corresponding voltages $255_{1-N}$ that accumulate across the EL segments $250_{1-N}$ when charged by the discrete sequence of charge pulses 170.

Figure 6:
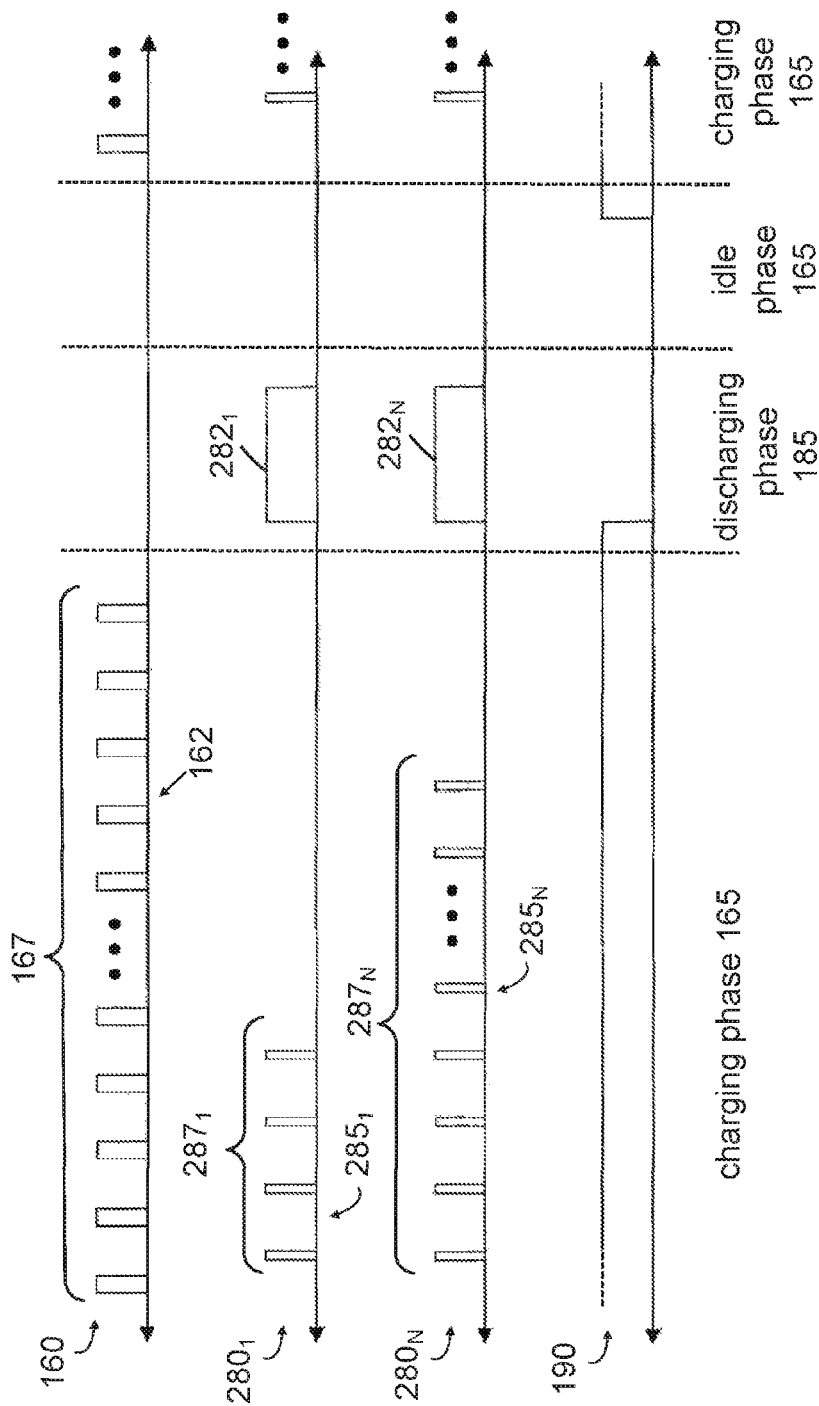
FIG. 6 is a timing diagram illustrating operation of the integrated drive circuit shown in FIG. 5.

Referring now to FIGS. 5 and 6, the discharge circuits $230_{1-N}$ are independently controllable by the controller 240, so that each of the parallel-connected EL segments $250_{1-N}$ can produce generally different light intensities. By also controlling the respective illuminations of the parallel-connected EL segments $250_{1-N}$ as a function time, the electroluminescent display can produce pseudo-animations (i.e., in which the light intensity emitted by the electroluminescent display varies both spatially within the EL display, and as a function of time, according to a pre-programmed sequence).

As before, a charging phase 165 commences shortly after the controller 240 asserts the isolation switch control signal 190, thereby closing the isolation switch 160 and reconnecting the charge circuit 120 to the power supply 110. Shortly after the charging phase 165 commences, the controller 240 transmits a sequence of gating signals 162 to the charge circuit 120, in response to which the charge circuit 120 begins transmitting the sequence of charge pulses 170 to the parallel-connected EL segments $250_{1-N}$. The controller 240 can generate the sequence of gating signals 162 (although not explicitly shown) according to a modulation scheme, such as PWM or PDM, so that each charge pulse in the sequence of charges pulses 170 delivers approximately the same incremental charge $\Delta Q$ to each of the parallel-connected EL segments $250_{1-N}$. In this way, because each of the parallel-connected EL segments $250_{1-N}$, has the same effective capacitance, the voltages $255_{1-N}$ across the parallel-connected EL segments $250_{1-N}$ accumulate roughly in proportion to the number of charge pulses delivered.

However, unlike the integrated charge circuit 100 (FIG. 1), when the charging circuit 120 is delivering the sequence of charge pulses 170 to the EL segments 250$_{1-N}$, simultaneously during the charging phase 165, the controller 240 also generates respective gating signals 285$_{1-N}$ for each corresponding discharge circuit 230$_{1-N}$. In response to the gating signals 285$_{1-N}$, the corresponding discharge circuits 230$_{1-N}$ partially dissipate the voltages 255$_{1-N}$ that have been accumulating across the EL segments 250$_{1-N}$ during the charging phase 165 by draining sequences of partial discharge pulses 275$_{1-N}$ from the EL segments 250$_{1-N}$. The controller 240 generates the gating signals 285$_{1-N}$ to coincide with time intervals between consecutive charge pulses in the sequence of charge pulses 170, so that the control exerted over the charge circuit 120 is more or less decoupled from the control exerted over the discharge circuits 230$_{1-N}$.

Looking only at the EL segment 250$_1$ for the moment, the controller 240 determines the final voltage 255$_1$ to be accumulated across the EL segment 250$_1$ at the end of the charging cycle 165 based on the characterization of the EL segment 250$_1$ and the desired light intensity for the EL segment 250$_1$. As described above, the controller 240 can make this determination (or be pre-programmed) by characterizing the illumination response of the EL segment 250$_1$ for a range of different voltages. The controller 240 achieves the desired final voltage 255$_1$ by partially dissipating the total voltage accumulated during the charging phase 165 due to the sequence of charge pulses 170.

Assuming each of the charge pulse 170 roughly accumulates an incremental voltage $\Delta V$ across the EL segment 250$_1$, the controller 240 generates an estimate of the total accumulated voltage 255$_1$ at the end of the charging cycle 165 based on the number of individual pulses in the sequence of charge pulses 170. From the total accumulated voltage 255$_1$, the controller 240 subtracts the desired final voltage to determine how much of the total accumulated voltage 255$_1$ should be dissipated using the sequence of partial discharge pulses 275$_1$ during the charging phase 165. The controller 240 then determines how many partial discharge pulses 275 to drain from the EL segment 250$_1$ through the shunt path 235$_1$ to achieve the desired final voltage for the EL segment 250$_1$. As each partial discharge pulse also drains approximately the same incremental charge $\Delta Q$ from the EL segment 250$_1$, the controller 240 can determine the number of partial discharge pulses 275$_1$ that will achieve the desired final voltage based upon the number of charge pulses 170 delivered by the charge circuit 120. The controller 240 can perform these calculations dynamically or, alternatively, as will be appreciated, the relationship between the number of charge pulses and discharge pulses can be pre-programmed into the controller 240.

The controller 240 controls each of the EL segments 250$_{1-N}$ in the manner described above for the EL segment 250$_1$ specifically. Accordingly, for each of EL segments 250$_{1-N}$, the controller 240 determines the corresponding number of partial discharge pulses 275$_{1-N}$, based on the number of charge pulses 170, which will achieve a corresponding final voltage 255$_{1-N}$ for that EL segment 250$_{1-N}$. As illustrated in FIG. 6, each corresponding sequence of partial discharge pulses 275$_{1-N}$ can have a different number of pulses, so that each of the EL segments 250$_{1-N}$ has a different final voltage at the end of the charging cycle 165. For example, the gating signals 285$_1$ provided to discharge circuit 230$_1$ has a number 287$_1$ of individual gating signals, which is not necessarily the same number 287$_N$ of gating signals 285$_N$ provided to discharge circuit 230$_N$. Due to the reverse isolation provides by the diodes 257$_{1-N}$, the controller 240 can exert effectively independent control over each discharge circuit 230$_{1-N}$, thereby allowing each of the EL segments 250$_{1-N}$ to produce different effective light intensities.

The charging phase 165 ends once the complete sequence of charging pulses 170 has been transmitted by the charging circuit 120, at which point each of the EL segments 250$_{1-N}$ will be at corresponding final voltages 255$_{1-N}$. (Depending on upon how much of the accumulated voltage 255$_{1-N}$ was partially dissipated during the charging phase 165, the corresponding final voltages 255$_{1-N}$ can be arbitrarily different.) The discharging phase 185 again commences following the end of the charging phase 165. The isolation switch control signal 190 is again driven to the low-voltage state in order to disconnect the power supply 110. At or near the same time, the controller 240 also generates a complete discharge pulse 282$_{1-N}$ for each corresponding discharge circuit 230$_{1-N}$, which is again of a suitably long duration to completely dissipate the final voltage 255$_{1-N}$ that was accumulated across each EL segment 250$_{1-N}$. During discharge of the EL segments 250$_{1-N}$, re-polarization of the fields within the respective phosphor layers generates photoemission roughly in proportion to the final accumulated voltages 255$_{1-N}$. An optional idle phase 195 can again separate the end of the discharging phase 185 from the start of a new charging phase 165.

Figure 7:
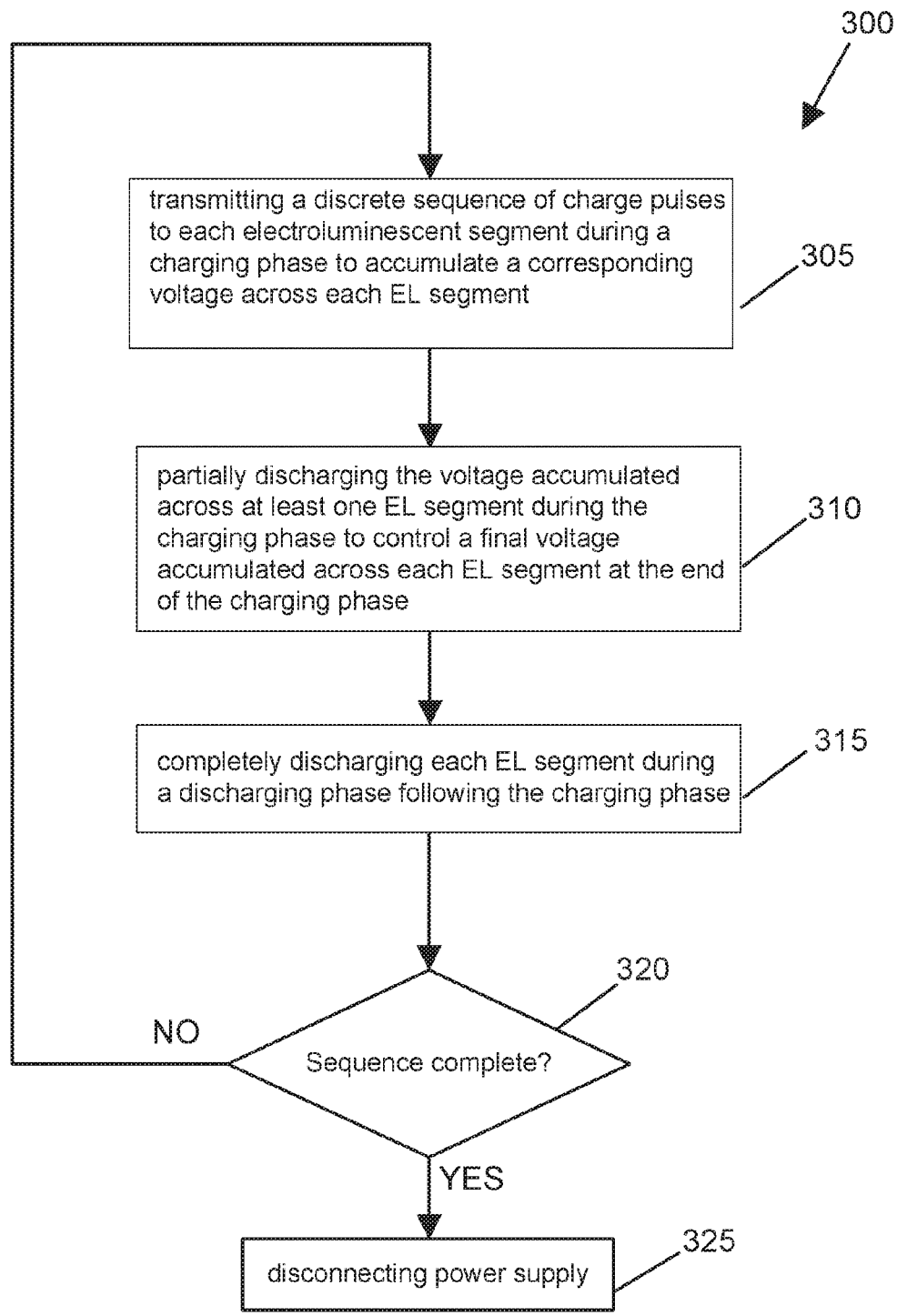
FIG. 7 is a flow chart illustrating a method of supplying power to an electroluminescent display having multiple parallel-connected electroluminescent segments.

Referring now to FIG. 7, there is shown a flow chart illustrating a method 300 of supplying power to an electroluminescent display having multiple parallel-connected electroluminescent segments forming a grid or matrix of segments. The method 300 can be performed, for example, using the exemplary integrated drive circuit 200 (FIG. 5) in order to generate a pre-programmed, animated light sequence. For the sake of clarity, some details related to the integrated drive circuit 200 will not be repeated during discussion of the method 300, which may be abbreviated.

At 305, a discrete sequence of charge pulses is transmitted to each parallel-connected EL segment in the El display to accumulate a corresponding voltage across each EL segment. The discrete sequence of charge pulses can be transmitted during a charging phase and contain a pre-determined number of individual charge pulses.

At 310, the voltage accumulated across one or more of at least one EL segment can be partially dissipated. In this way, the final voltage accumulated across each of the parallel-connected segments at the end of the charging cycle is controlled, i.e. as the difference between the total accumulated voltage and the partially dissipated voltage.

In one variation of the method 300, the EL segments are partially discharged by draining a discrete sequence of partial discharge pulses from respective EL segments during the charging phase. By controlling the incremental charge $\Delta Q$ accumulated or drained from the EL, to control the corresponding final voltage for a given EL segment, the number of partial discharge pulses to be drained is determined based upon the number of charge pulses in the discrete sequence of charge pulses. In some cases, the discrete sequence of partial discharge pulses is also timed to coincide with intervals between successive charge pulses in the discrete sequence of charge pulses, so that the charge and discharge pulses are non-overlapping in time.

At 315, each EL segment is completely discharged during a discharging phase following the charging phase. For example, a respective shunt path can be formed across each EL segment through which to dissipate whatever final voltage had accumulated across the EL segments during the charging phase. During discharge, the EL segments emit light having an intensity that is varies approximately in proportion to their final accumulated voltages at the end of the charging phase.

At 320, it is checked whether the complete sequence has been performed. If the compete sequence has been performed, the method 300 branches to 325, the source of power for the EL display is disconnected and the method 300 ends. However, if at 320, it is determined that the sequence is not complete, the method 300 branches back to 305 and repeats until the complete sequence has been executed. During each successive iteration of the method 300, the different EL segments are controlled in the manner described to produce light intensities that vary both spatially within the EL display, and as a function of time, according to the pre-programmed sequence. In this way, rudimentary animations can be generated by following the method 300.

The present invention has been described herein by way of exemplary embodiments without limitation. Certain modifications and variations to these exemplary embodiments may be apparent without departing from the scope of the invention, which is limited only by the appended claims.

We claim:

1. An integrated drive circuit for an electroluminescent display comprising at least one electroluminescent segment, the integrated drive circuit comprising:
   a charge circuit coupled to the at least one electroluminescent segment, wherein the charge circuit is configured to transmit energy received from a power supply to the at least one electroluminescent segment to accumulate an accumulated voltage across the at least one electroluminescent segment, and the charge circuit comprises a storage element coupled to the power supply and a gating switch controllable to release energy from the storage element to the at least one electroluminescent segment;
   a discharge circuit coupled to the at least one electroluminescent segment and configured to dissipate the accumulated voltage by selectively forming a shunt path across the at least one electroluminescent segment to drain energy stored in the at least one electroluminescent segment, wherein the discharge circuit comprises a shunt switch connected across the at least one electroluminescent segment and is controllable to form the shunt path; and
   a controller configured to control a final voltage of the accumulated voltage at an end of a charging phase by controlling the discharge circuit to at least partially discharge the accumulated voltage during the charging phase.

2. The integrated drive circuit of claim 1, wherein the controller is configured to control the voltage across the at least one electroluminescent segment by generating a charge control signal for the charge circuit and a discharge control signal for the discharge circuit.

3. The integrated drive circuit of claim 2, wherein the charge circuit is configured to generate and transmit a charging signal to the at least one electroluminescent segment in response to the charge control signal.

4. The integrated drive circuit of claim 2, wherein the discharge circuit is configured to selectively form the shunt path across the at least one electroluminescent segment in response to the discharge control signal.

5. The integrated drive circuit of claim 4, wherein the shunt switch is controllable by the discharge control signal to provide a short circuit across the at least one electroluminescent segment.

6. The integrated drive circuit of claim 2, wherein the controller is configured to reset the voltage across the at least one electroluminescent segment by controlling the discharge circuit to completely discharge the at least one electroluminescent segment during a discharging phase succeeding the charging phase.

7. The integrated drive circuit of claim 2, wherein
   the electroluminescent display comprises a plurality of parallel-connected electroluminescent segments;
   the charge circuit is coupled to each electroluminescent segment and is configured to transmit a charging signal to the plurality of electroluminescent segments to accumulate a corresponding voltage across each electroluminescent segment;
   a corresponding discharge circuit is coupled to each electroluminescent segment, each corresponding discharge circuit configured to selectively form a corresponding shunt path across that electroluminescent segment to dissipate the corresponding accumulated voltage; and
   the controller is configured to control the corresponding voltage accumulated across each electroluminescent segment by generating a corresponding discharge control signal for each corresponding discharge circuit.

8. The integrated drive circuit of claim 7, wherein the controller is configured to control the corresponding final voltage accumulated by each electroluminescent segment at the end of the charging phase independently of other electroluminescent segments, and the controller is configured to generate different discharge control signals for at least two electroluminescent segments whereby the corresponding final voltages of the at least two electroluminescent segments differ.

9. The integrated drive circuit of claim 7, wherein the controller is configured to reset the voltage across each electroluminescent segment by controlling each corresponding discharge circuit to completely discharge that electroluminescent segment during a discharging phase succeeding the charging phase.

10. The integrated drive circuit of claim 1, further comprising an isolation switch for coupling the charge circuit to the power supply, the isolation switch controllable to selectively connect and disconnect the power supply to and from the charge circuit.

11. A method of supplying power to an electroluminescent display comprising at least one electroluminescent segment, the method comprising:
   accumulating a voltage across the at least one electroluminescent segment during a charging phase by operating a charge circuit to transmit energy from a power supply to the at least one electroluminescent segment, wherein the charge circuit comprises a storage element coupled to the power supply and a gate switch controllable to release energy from the storage element to the at least one electroluminescent segment;
   operating a discharge circuit coupled to the at least one electroluminescent segment to dissipate the voltage accumulated across the at least one electroluminescent segment during a discharging phase succeeding the charging phase by selectively forming a shunt path across the at least one electroluminescent segment, wherein the discharge circuit comprises a shunt switch connected across the at least one electroluminescent segment and is controllable to form the shunt path; and
   controlling, by a controller, a final voltage of the voltage accumulated across the at least one electroluminescent segment at an end of the charging phase by at least partially discharging the voltage accumulated across the at least one electroluminescent segment during the charging phase.

12. The method of claim 11, wherein the electroluminescent display comprises a plurality of parallel-connected electroluminescent segments, and wherein the method further comprises:
   accumulating a corresponding voltage across each electroluminescent segment during the charging phase by transmitting a charging signal to each electroluminescent segment; and
   dissipating the corresponding voltage accumulated across each electroluminescent segment during the discharging phase by connecting a corresponding shunt path across that electroluminescent segment.

13. The method of claim 12, further comprising controlling a corresponding final voltage accumulated across each electroluminescent segment at the end of the charging phase by partially discharging the corresponding voltage accumulated across that electroluminescent segment during the charging phase.

14. The method of claim 13, further comprising controlling the corresponding final voltage accumulated by each electroluminescent segment at the end of the charging phase independently of other electroluminescent segments, wherein the method further comprises generating different discharge control signals for at least two electroluminescent segments whereby the corresponding final voltages of the at least two electroluminescent segments differ.

15. The method of claim 13, further comprising completely discharging each electroluminescent segment during the discharging phase.

16. The method of claim 11, wherein accumulating the voltage across the electroluminescent segment during the charging phase comprises:
   transmitting a charging signal to the electroluminescent segment from the power supply.

17. An integrated drive circuit for an electroluminescent display comprising a plurality of parallel-connected electroluminescent segments, the integrated drive circuit comprising:
   a charge circuit coupled to each electroluminescent segment, the charge circuit configured to transmit energy received from a power supply to the plurality of electroluminescent segments to accumulate an accumulated voltage across each electroluminescent segment, wherein the charge circuit comprises a storage element coupled to the power supply and a gating switch controllable to release energy from the storage element to the respective electroluminescent segment;
   a discharge circuit coupled to each electroluminescent segment, each discharge circuit is configured to dissipate the accumulated voltage at each electroluminescent segment by selectively forming a shunt path across that electroluminescent segment to drain energy stored in that electroluminescent segment, wherein the discharge circuit comprises a shunt switch connected across the respective electroluminescent segment and is controllable to form the respective shunt path; and
   a controller configured to control a final voltage of the accumulated voltage of at least one electroluminescent segment at an end of a charging phase by controlling the corresponding discharge circuit to at least partially discharge the accumulated voltage of the at least one electroluminescent segment during the charging phase.

18. The integrated drive circuit of claim 17, wherein the controller is configured to control the corresponding final voltage accumulated by each electroluminescent segment at the end of the charging phase independently of other electroluminescent segments, and the controller is configured to generate different discharge control signals for at least two electroluminescent segments whereby the corresponding final voltages of the at least two electroluminescent segments differ.

19. The integrated drive circuit of claim 17, wherein:
   each charge circuit is configured to transmit a charging signal to the plurality of electroluminescent segments to accumulate the corresponding voltage across each electroluminescent segment.

20. The integrated drive circuit of claim 17, wherein the controller is configured to reset the voltage across each electroluminescent segment by controlling each corresponding discharge circuit to completely discharge that electroluminescent segment during a discharging phase succeeding the charging phase.

* * * * *